(12) United States Patent
Allen et al.

(10) Patent No.: US 7,058,758 B2
(45) Date of Patent: Jun. 6, 2006

(54) LOAD BALANCING TO SUPPORT TAPE AND DISK SUBSYSTEMS ON SHARED FIBRE CHANNEL ADAPTERS

(75) Inventors: James Patrick Allen, Austin, TX (US); Jayant Vitthalbhai Patel, Austin, TX (US); Stephen M. Tee, Marble Falls, TX (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 10/687,260

(22) Filed: Oct. 16, 2003

(65) Prior Publication Data

US 2005/0086426 A1   Apr. 21, 2005

(51) Int. Cl.
*G06F 12/00* (2006.01)
(52) U.S. Cl. .................................. 711/111; 711/162
(58) Field of Classification Search .................. None
See application file for complete search history.

(56) References Cited

U.S. PATENT DOCUMENTS

| | | | |
|---|---|---|---|
| 5,768,623 A | 6/1998 | Judd et al. ................. 395/857 |
| 6,073,218 A | 6/2000 | DeKoning et al. .......... 711/150 |
| 6,081,812 A | 6/2000 | Boggs et al. ................ 707/202 |
| 6,219,753 B1 | 4/2001 | Richardson ................. 711/114 |
| 6,327,613 B1 * | 12/2001 | Goshey et al. .............. 709/208 |
| 6,343,324 B1 | 1/2002 | Hubis et al. ................ 709/229 |
| 6,473,783 B1 * | 10/2002 | Goshey et al. .............. 709/203 |
| 6,502,167 B1 | 12/2002 | Tanaka et al. .............. 711/114 |
| 6,571,355 B1 | 5/2003 | Linnell .......................... 714/9 |
| 2002/0059372 A1 * | 5/2002 | Goshev et al. .............. 709/203 |
| 2002/0065962 A1 | 5/2002 | Bakke et al. ................. 710/38 |
| 2002/0166005 A1 | 11/2002 | Errico .......................... 710/38 |
| 2002/0194294 A1 | 12/2002 | Blumenau et al. .......... 709/213 |
| 2005/0251588 A1 * | 11/2005 | Hoch et al. .................... 710/5 |

* cited by examiner

*Primary Examiner*—Kevin Verbrugge
(74) *Attorney, Agent, or Firm*—Duke W. Yee; Marilyn Smith Dawkins; Stephen R. Tkacs

(57) ABSTRACT

A mechanism is provided for monitoring I/O activity of each device and the total I/O activity for each adapter. When there is low I/O activity for the tape subsystem, the I/O for the disk subsystems may be spread across all available adapters and paths. When I/O activity for the tape subsystem increases, the I/O activity for the disk subsystems may be reduced on the adapter processing the tape I/O, but will continue across all other adapters. If the tape subsystem begins to report errors due to I/O starvation, the disk I/O activity may be adjusted until the errors stop.

21 Claims, 2 Drawing Sheets

LOAD BALANCING TO SUPPORT TAPE AND DISK SUBSYSTEMS ON SHARED FIBRE CHANNEL ADAPTERS

BACKGROUND OF THE INVENTION

1. Technical Field

The present invention relates to storage area networks and, in particular, to multi-path input/output in a storage area network. Still more particularly, the present invention provides a method, apparatus, and program for load balancing to support tape and disk subsystems with shared paths in a multi-path input/output environment.

2. Description of Related Art

A storage area network (SAN) is a network of storage devices. In large enterprises, a SAN connects multiple machines to a centralized pool of disk storage. Compared to managing hundreds of servers, each with its own storage devices, a SAN improves system administration.

In multiple path input/output (MPIO), there is a plurality of routes or connections from one specific machine to one specific device. For example, with a logical disk device on a redundant array of independent disks (RAID), the accessing host uses a Fibre channel (FC) adapter connected to an FC switch, and the FC switch in turn is attached to the RAID array. There may be eight, or as many as thirty-two or more, FC adapters in both the host and the device and there may be many more FC switches in the SAN fabric.

Considering a SAN with eight adapters in the host and the device, if each host adapter is connected to a device adapter through a switch, then there may be eight paths from the host to the device. If the switches are interconnected, then there may be many more paths from the host to the device. Path management software chooses paths to be used for each device.

Attaching a tape subsystem and a disk subsystem to the same Fibre channel adapter is currently not supported, because a tape subsystem achieves optimum performance with a dedicated path from the host. In order to perform write operations on a tape, the tape must spin. If data stops, the tape must stop spinning and a rewind operation must be performed to reposition the tape to wait for more data. As such, a tape device operates best with a consistent flow of data to be written.

A tape subsystem generates an underflow error when the amount of data in a buffer drops below a predefined threshold. The tape subsystem also generates an overflow error when the amount of data in the buffer exceeds another threshold. The problem of I/O starvation occurs due to the sequential streaming of tape storage technology. Tape subsystems with large caches are as susceptible to I/O starvation as subsystems with smaller caches.

If the path to the tape subsystem is shared and resources are being used by competing storage subsystems, the amount of input/output (I/O) to the tape subsystem may decrease and result in underflow errors due to I/O starvation. This may lead to a backup operation failing and having to be restarted, which may result in timeout errors. Therefore, current systems dedicate one adapter to the tape subsystem.

However, since the adapter dedicated to the tape subsystem is not utilized most of the time, the host is not able to efficiently utilize all of the paths from all of the adapters. When an adapter is dedicated to the tape subsystem, a large number of paths are also dedicated to that subsystem.

SUMMARY OF THE INVENTION

The present invention recognizes the disadvantages of the prior art and provides a mechanism load balancing to support tape and disk subsystems with shared paths in a multi-path input/output environment. The present invention provides a mechanism for monitoring I/O activity of each device and the total I/O activity for each adapter. When there is low I/O activity for the tape subsystem, the I/O for the disk subsystems may be spread across all available adapters and paths. When I/O activity for the tape subsystem increases, the I/O activity for the disk subsystems may be reduced on the adapter processing the tape I/O, but will continue across all other adapters. If the tape subsystem begins to report errors due to I/O starvation, the disk I/O activity may be adjusted until the errors stop.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
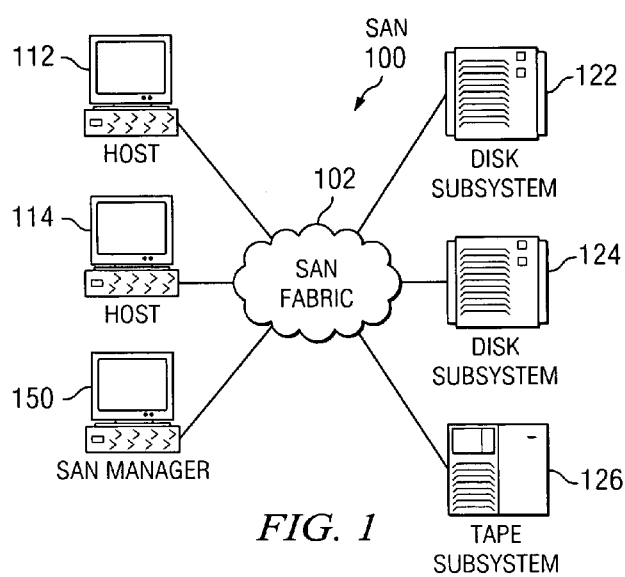
FIG. 1 depicts a pictorial representation of a storage area network in which the present invention may be implemented.

With reference now to the figures, FIG. 1 depicts a pictorial representation of a storage area network in which the present invention may be implemented. Storage area network (SAN) 100 contains SAN fabric 102, which is a combination of interconnected switches, which collectively provide a routing infrastructure within SAN 100.

In the depicted example, hosts 112, 114 are connected to fabric 102 along with disk arrays 122, 124, 126. Hosts 112, 114 may be, for example, personal computers, network computers, servers, or the like. In the depicted example, hosts 112, 114 access disk subsystems 122, 124 and tape subsystem 126 through paths in the SAN fabric. SAN 100 may include additional hosts and/or other storage devices not shown. FIG. 1 is intended as an example, and not as an architectural limitation for the present invention.

Figure 2:
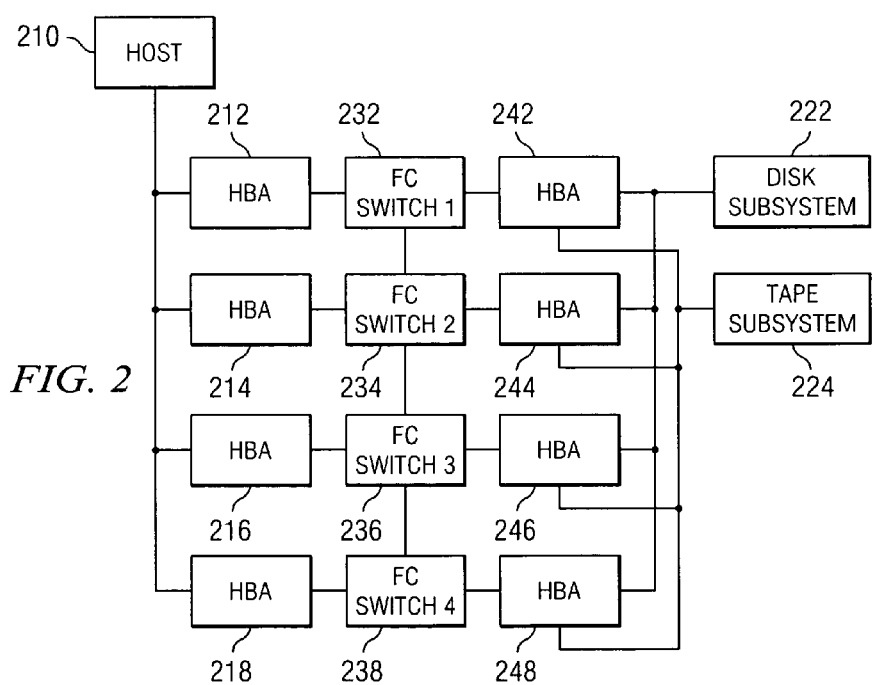
FIG. 2 depicts an example storage area network configuration in accordance with a preferred embodiment of the present invention.

FIG. 2 depicts an example storage area network configuration in accordance with a preferred embodiment of the present invention. Host 210 is connected to a plurality of host bus adapters 212, 214, 216, 218. In the depicted example, the target devices are disk subsystem 222 and tape subsystem 224. The disk subsystem and tape subsystem are connected to host bus adapters 242, 244, 246, 248. Host bus adapter 212 is connected to host bus adapter 242 through Fibre channel (FC) switch 1 232. Similarly, host bus adapter 214 is connected to host bus adapter 244 through FC switch 2 234, host bus adapter 216 is connected to host bus adapter 246 through FC switch 3 236, and host bus adapter 218 is connected to host bus adapter 248 through FC switch 4 238.

The host and the storage subsystems are connected to the SAN fabric through four host bus adapters. Typically, a host or storage subsystem will be connected to between eight and thirty-two host bus adapters; however, more or fewer host bus adapters may be connected depending upon the implementation.

With interconnection between the switches and multiple levels of switches, the number of paths may become extensive. In addition, many of the paths share resources. Path control manager (PCM) software in host 210 for the disk subsystem selects a path for I/O to the disk subsystem. Similarly, a PCM for the tape subsystem selects a path for I/O to the tape subsystem.

In accordance with a preferred embodiment of the present invention, a mechanism is provided for monitoring I/O activity of each device and the total I/O activity for each adapter. When there is low I/O activity for the tape subsystem, the I/O for the disk subsystems may be spread across all available adapters and paths. When I/O activity for the tape subsystem increases, the I/O activity for the disk subsystems may be reduced on the adapter processing the tape I/O, but will continue across all other adapters. If the tape subsystem begins to report errors due to I/O starvation, the disk I/O activity may be adjusted until the errors stop.

Figure 3:
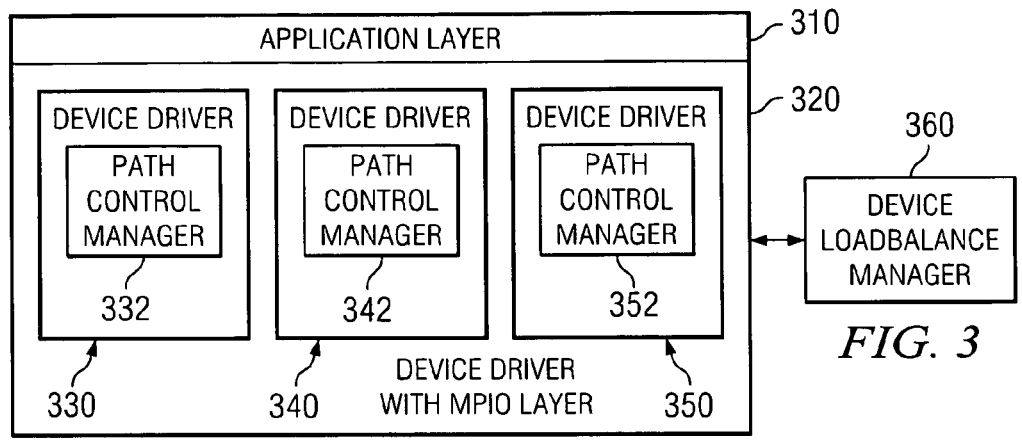
FIG. 3 is a block diagram illustrating a software configuration within a host computer in accordance with a preferred embodiment of the present invention.

FIG. 3 is a block diagram illustrating a software configuration within a host computer in accordance with a preferred embodiment of the present invention. Application layer 310 sends I/O operations for device driver layer 320. In an exemplary embodiment, the device driver layer includes MPIO functionality. In the depicted example, the device driver layer includes device driver 330 for a first device, device driver 340 for a second device, and device driver 350 for a third device. More or fewer devices and, hence, more or fewer device drivers may be included. Device driver 330 includes path control manager (PCM) 332; device driver 340 includes PCM 342; and, device driver 350 includes PCM 352. When I/O is to be sent to the storage subsystem, an appropriate one of PCMs 332, 342, 352 selects one of a plurality of paths as the transmission conduit.

Device loadbalance manager (DLM) 360 monitors for I/O activity for each device and the total activity per adapter. A device driver in device driver layer 320 for the tape subsystem, such as device driver 330, monitors for errors. As the tape I/O activity increases and the tape subsystem begins to report errors due to I/O starvation, the device driver notifies the DLM of the errors and the DLM code begins to send commands to the PCMs, such as PCMs 342, 352, controlling the disk subsystem paths based on adapter I/O activity.

In response to the commands, PCMs 342, 352 disable disk subsystem paths that are utilizing the adapter that the tape subsystem is using from being used for I/O. Disk subsystems with more alternate paths will be disabled first and disk subsystems with only one alternate path will be disabled last. The number of paths to be disabled may also depend on I/O activity per disk.

FIG. 3 is intended as an example and is not meant to limit the present invention. Modifications may be made to the software configuration within the scope of the present invention. For example, path management code may be embodied in an MPIO virtual device driver layer above device driver layer 320. As another example, device loadbalancing path management code may be embodied in device driver layer 320. Other modifications will be apparent to those of ordinary skill in the art.

Figure 4:
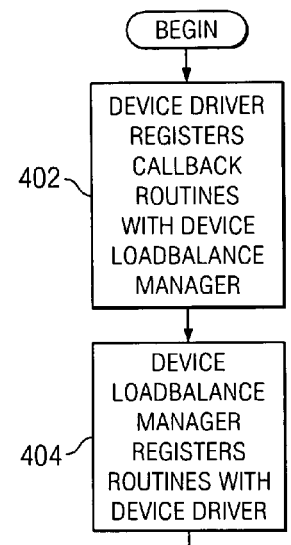
FIG. 4 is a flowchart illustrating communication between a device driver and a device loadbalance manager in accordance with a preferred embodiment of the present invention.

FIG. 4 is a flowchart illustrating communication between a device driver and a device loadbalance manager in accordance with a preferred embodiment of the present invention. The process begins and the device driver registers callback routines with the DLM (step 402). Then, the DLM registers routines with the device driver (step 404) and the process ends. The device driver may then use the routines to report I/O returns to the DLM. Similarly, the DLM may use the callback routines to send commands to the PCMs in the device drivers.

Figure 5:
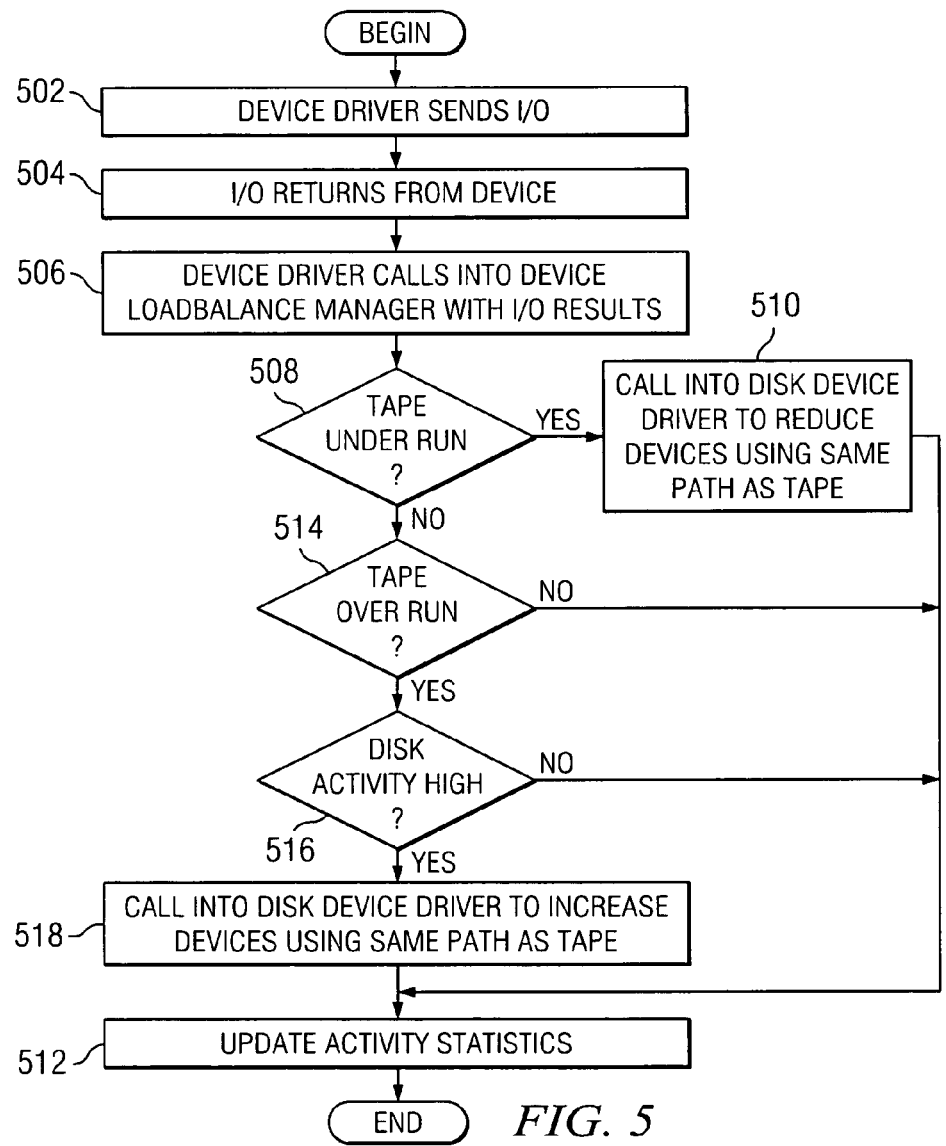
FIG. 5 is a flowchart illustrating the operation of a device loadbalance manager in accordance with a preferred embodiment of the present invention.

Turning now to FIG. 5, a flowchart is shown illustrating the operation of a device loadbalance manager in accordance with a preferred embodiment of the present invention. The process begins and the device driver sends an I/O (step 502) and the I/O returns from the device (step 504). The device driver calls into the DLM with the I/O results (step 506).

Next, a determination is made as to whether the tape subsystem is under run (step 508). A tape subsystem is under run if the tape subsystem does not receive enough I/O to keep the tape spinning. This determination may be made by determining whether I/O activity for the tape subsystem drops below a predetermined threshold. Alternatively, this determination may be made by determining whether an I/O starvation error is received from the tape subsystem. In yet another embodiment, a combination of these determinations may be used.

If the tape subsystem is under run, the DLM calls into the device driver to reduce the devices using the same path as the tape (step 510). The DLM may send commands instructing the PCMs for one or more disk subsystems to reduce the priority of paths using the host bus adapter of the tape subsystem or to disable the paths altogether. Thereafter, the DLM updates activity statistics (step 512) and ends.

If the tape subsystem is not under run in step 508, a determination is made as to whether the tape subsystem is over run (step 514). A tape subsystem is over run if the tape subsystem receives too much I/O. This determination may be made by determining whether I/O activity for the tape subsystem exceeds a predetermined threshold. Alternatively, this determination may be made by determining whether a buffer overflow error is received from the tape subsystem. In yet another embodiment, a combination of these determinations may be used.

If the tape subsystem is over run, a determination is made as to whether disk activity is high for one or more of the disk subsystems (step 516). If disk activity is high, the DLM calls into the device driver to increase the devices using the same path as the tape (step 518). The DLM may send commands instructing the PCMs for one or more disk subsystems to increase the priority of paths using the host bus adapter of the tape subsystem or to enable the paths that were previously disabled. Thereafter, the DLM updates activity statistics (step 512) and ends.

If the tape subsystem is not over run in step 514 or the disk activity is not high in step 516, the process continues to step 512 to update activity statistics and the process ends.

Preferably, the DLM balances the load across the adapters while keeping the HBA for the tape subsystem fairly dedicated to the tape subsystem. For example, if activity for a disk subsystem is high while activity for the tape subsystem is very low, the DLM may send commands to allow the disk subsystem to use paths that share the HBA of the tape subsystem. On the other hand, if I/O activity for a first disk subsystem is very high and I/O activity for a second disk subsystem is not very high, the DLM may send commands to allow the second disk subsystem to use paths that share the HBA of the tape subsystem; however, the DLM may not send commands to allow the first disk subsystem to use paths that use the HBA of the tape subsystem, because the high activity for the first disk subsystem may result in starvation errors in the tape subsystem.

Thus, the present invention solves the disadvantages of the present invention by providing a device loadbalance manager for monitoring I/O activity of each device and the total I/O activity for each adapter. When there is low I/O activity for the tape subsystem, the device loadbalance manager spreads the I/O for the disk subsystems across all available adapters and paths. When I/O activity for the tape subsystem increases, the device loadbalance manager may reduce the I/O activity for the disk subsystems on the adapter processing the tape I/O, while allowing I/O activity to continue across all other adapters. If the tape subsystem begins to report errors due to I/O starvation, the disk I/O activity may be adjusted until the errors stop.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for supporting a tape subsystem and a disk subsystem on a shared host adapter, the method comprising:
   designating one of a plurality of host adapters as a designated host adapter for a tape subsystem;
   balancing input/output activity for one or more disk subsystems across the plurality of host adapters;
   determining whether the tape subsystem is under run;
   responsive to the tape subsystem being under run, identifying at least one path for a first disk subsystem that uses the designated host adapter; and
   reducing input/output activity for the first disk subsystem using the identified at least one path.

2. The method of claim 1, further comprising:
   monitoring input/output activity for each host adapter and for the tape subsystem and the disk subsystem.

3. The method of claim 2, wherein determining whether the tape subsystem is under run includes determining whether input/output activity for the tape subsystem is below a predetermined threshold.

4. The method of claim 2, further comprising:
   determining whether the tape subsystem is over run;
   determining whether input/output activity for a second disk subsystem is high; and
   responsive to the tape subsystem being over run and input/output activity for the second disk subsystem being high, increasing input/output activity for the second disk subsystem using at least one path that uses the designated host adapter.

5. The method of claim 4, wherein determining whether input/output activity for the second disk subsystem is high includes determining whether input/output activity for the second disk subsystem exceeds a predetermined threshold.

6. The method of claim 4, wherein determining whether the tape subsystem is over run includes determining whether input/output activity for the tape subsystem exceeds a predetermined threshold.

7. The method of claim 4, wherein determining whether the tape subsystem is over run includes determining whether at least one buffer overflow error is received from the tape subsystem.

8. The method of claim 1, wherein determining whether the tape subsystem is under run includes determining whether at least one input/output starvation error is received from the tape subsystem.

9. The method of claim 1, wherein reducing input/output activity for the first disk subsystem using the identified at least one path includes decreasing a priority of the at least one path.

10. The method of claim 1, wherein reducing input/output activity for the first disk subsystem using the identified at least one path includes disabling the at least one path.

11. An apparatus for supporting a tape subsystem and a disk subsystem on a shared host adapter, the apparatus comprising:
    means for designating one of a plurality of host adapters as a designated host adapter for a tape subsystem;
    means for balancing input/output activity for one or more disk subsystems across the plurality of host adapters;
    means for determining whether the tape subsystem is under run;
    means, responsive to the tape subsystem being under run, for identifying at least one path for a first disk subsystem that uses the designated host adapter; and
    means for reducing input/output activity for the first disk subsystem using the identified at least one path.

12. The apparatus of claim 11, further comprising:
    means for monitoring input/output activity for each host adapter and for the tape subsystem and the disk subsystem.

13. The apparatus of claim 12, wherein the means for determining whether the tape subsystem is under run includes means for determining whether input/output activity for the tape subsystem is below a predetermined threshold.

14. The apparatus of claim 12, further comprising:
    means for determining whether the tape subsystem is over run;
    means for determining whether input/output activity for a second disk subsystem is high; and
    means, responsive to the tape subsystem being over run and input/output activity for the second disk subsystem being high, for increasing input/output activity for the second disk subsystem using at least one path that uses the designated host adapter.

15. The apparatus of claim 14, wherein the means for determining whether input/output activity for the second disk subsystem is high includes means for determining whether input/output activity for the second disk subsystem exceeds a predetermined threshold.

16. The apparatus of claim 14, wherein the means for determining whether the tape subsystem is over run includes means for determining whether input/output activity for the tape subsystem exceeds a predetermined threshold.

17. The apparatus of claim 14, wherein the means for determining whether the tape subsystem is over run includes means for determining whether at least one buffer overflow error is received from the tape subsystem.

18. The apparatus of claim 11, wherein the means for determining whether the tape subsystem is under run includes means for determining whether at least one input/output starvation error is received from the tape subsystem.

19. The apparatus of claim 11, wherein the means for reducing input/output activity for the first disk subsystem using the identified at least one path includes means for decreasing a priority of the at least one path.

20. The apparatus of claim 11, wherein the means for reducing input/output activity for the first disk subsystem using the identified at least one path includes means for disabling the at least one path.

21. A computer program product, in a tangible computer readable medium, for supporting a tape subsystem and a disk subsystem on a shared host adapter, the computer program product comprising:

instructions for designating one of a plurality of host adapters as a designated host adapter for a tape subsystem;

instructions for balancing input/output activity for one or more disk subsystems across the plurality of host adapters;

instructions for determining whether the tape subsystem is under run;

instructions, responsive to the tape subsystem being under run, for identifying at least one path for a first disk subsystem that uses the designated host adapter; and instructions for reducing input/output activity for the first disk subsystem using the identified at least one path.

* * * * *